United States Patent
Chun et al.

(10) Patent No.: US 9,900,056 B2
(45) Date of Patent: Feb. 20, 2018

(54) SYSTEM AND METHOD FOR DELAYED APPLICATION PROCESSOR INITIALIZATION DURING WIRELESS CHARGING

(71) Applicant: QUALCOMM Incorporated, San Diego, CA (US)

(72) Inventors: Christopher Kong Yee Chun, Austin, TX (US); Shadi Hawawini, Mountain View, CA (US)

(73) Assignee: QUALCOMM Incorporated, San Diego, CA (US)

(*) Notice: Subject to any disclaimer, the term of this patent is extended or adjusted under 35 U.S.C. 154(b) by 854 days.

(21) Appl. No.: 14/049,724

(22) Filed: Oct. 9, 2013

(65) Prior Publication Data

US 2014/0368050 A1  Dec. 18, 2014

Related U.S. Application Data

(60) Provisional application No. 61/835,363, filed on Jun. 14, 2013.

(51) Int. Cl.
*H04B 5/00* (2006.01)
*H02J 50/60* (2016.01)
(Continued)

(52) U.S. Cl.
CPC ............ *H04B 5/0037* (2013.01); *H02J 5/00* (2013.01); *H02J 5/005* (2013.01); *H02J 7/02* (2013.01);
(Continued)

(58) Field of Classification Search
CPC .......... H04B 5/0037; H02J 7/025; H02J 5/005
(Continued)

(56) References Cited

U.S. PATENT DOCUMENTS 6,313,612 B1 * 11/2001 Honda ................... G04C 10/00
320/139
7,034,503 B2 * 4/2006 Veselic ................... G06F 1/266
320/128
(Continued)

FOREIGN PATENT DOCUMENTS

CN   101282585 A   10/2008
CN   103107605 A   5/2013
(Continued)

OTHER PUBLICATIONS

International Search Report and Written Opinion—PCT/US2014/040533—ISA/EPO—dated Sep. 15, 2014.

*Primary Examiner* — Jared Fureman
*Assistant Examiner* — Michael Warmflash
(74) *Attorney, Agent, or Firm* — Knobbe, Martens, Olson & Bear, LLP

(57) ABSTRACT

A system and method providing for delayed initialization of a device in a wireless charging environment. In certain aspects, a device is configured to detect power wirelessly received from a power transmitter. The device may further wirelessly transmit a message to the power transmitter in response to the received power, further determining that a power level of the received power has been adjusted in response to the message. In response to the determining the power level has been adjusted, a controller that is powered by the adjusted power level may be initialized.

26 Claims, 9 Drawing Sheets

(51) Int. Cl.
*H02J 50/40* (2016.01)
*H02J 50/12* (2016.01)
*H02J 7/02* (2016.01)
*H02J 5/00* (2016.01)
*H02J 50/80* (2016.01)

(52) U.S. Cl.
CPC .............. *H02J 7/025* (2013.01); *H02J 50/12* (2016.02); *H02J 50/40* (2016.02); *H02J 50/60* (2016.02); *H02J 50/80* (2016.02)

(58) Field of Classification Search
USPC .......................................... 307/104
See application file for complete search history.

(56) References Cited

U.S. PATENT DOCUMENTS

| | | | | |
|---|---|---|---|---|
| 7,605,496 B2 * | 10/2009 | Stevens | ............... | H02J 5/005 307/17 |
| 7,812,481 B2 * | 10/2010 | Iisaka | ............... | H02J 7/025 307/104 |
| 8,188,717 B2 * | 5/2012 | Schubert | ............... | H02J 7/025 320/137 |
| 8,228,027 B2 | 7/2012 | Gao | | |
| 9,035,600 B2 * | 5/2015 | Park | ............... | G06F 1/263 307/104 |
| 9,214,988 B2 * | 12/2015 | Hillan | ............... | H04B 5/02 |
| 2007/0168596 A1 * | 7/2007 | Hall | ............... | H04L 12/10 710/313 |
| 2007/0279002 A1 * | 12/2007 | Partovi | ............... | H02J 7/0027 320/115 |
| 2010/0033021 A1 * | 2/2010 | Bennett | ............... | H02J 17/00 307/104 |
| 2012/0161697 A1 * | 6/2012 | Park | ............... | G06F 1/263 320/108 |
| 2012/0223589 A1 * | 9/2012 | Low | ............... | H04B 5/0037 307/104 |
| 2012/0249449 A1 * | 10/2012 | Tseng | ............... | G06F 3/0418 345/173 |
| 2012/0261998 A1 | 10/2012 | Sato | | |
| 2013/0043951 A1 | 2/2013 | Irish et al. | | |
| 2013/0057070 A1 * | 3/2013 | Onishi | ............... | G06K 19/0709 307/43 |
| 2013/0091225 A1 | 4/2013 | Eaton | | |
| 2013/0127410 A1 | 5/2013 | Park et al. | | |
| 2015/0155718 A1 * | 6/2015 | Jung | ............... | H01F 38/14 307/104 |

FOREIGN PATENT DOCUMENTS

| | | |
|---|---|---|
| EP | 2541794 A2 | 1/2013 |
| WO | WO-2010040015 A2 | 4/2010 |

* cited by examiner

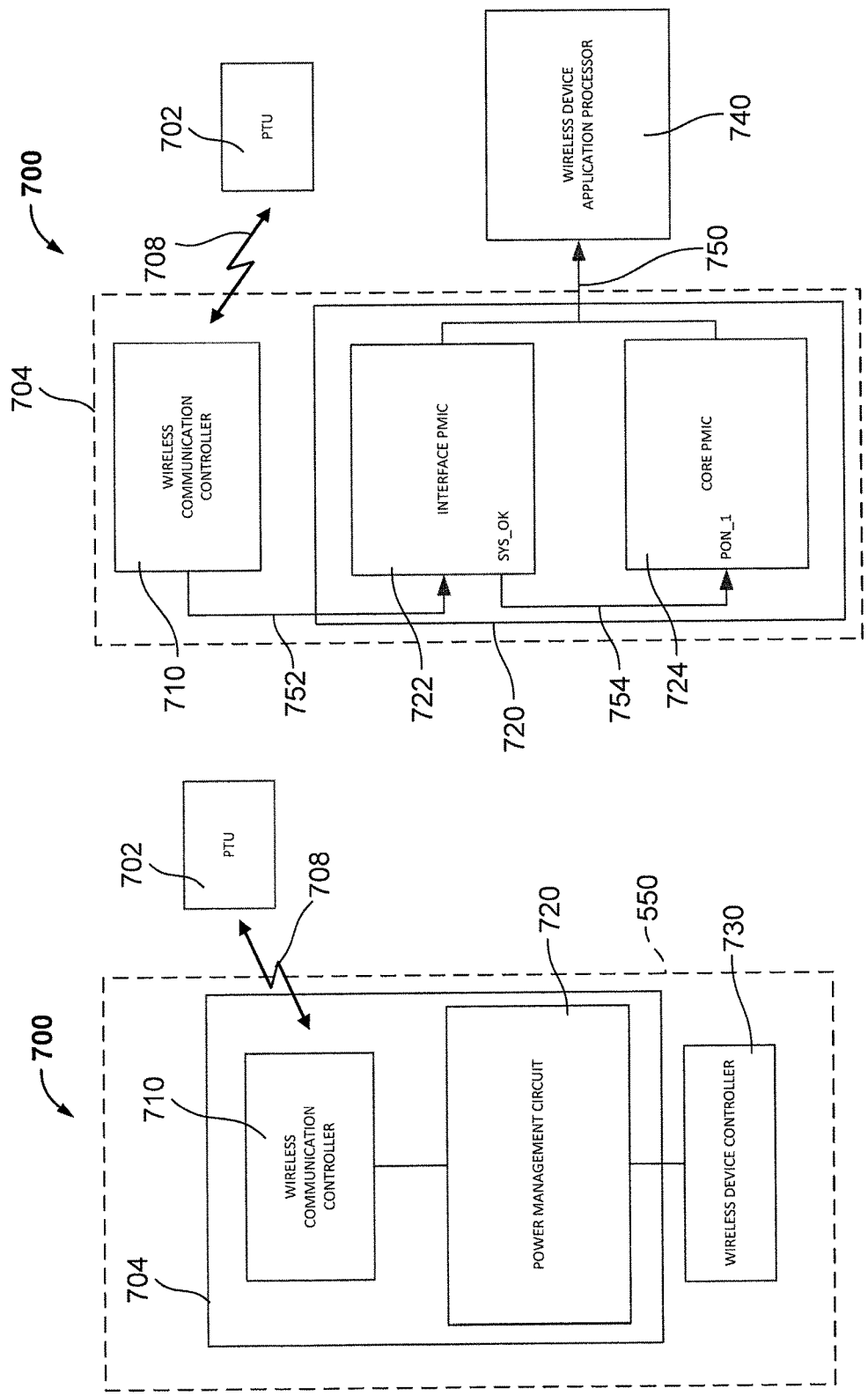

SYSTEM AND METHOD FOR DELAYED APPLICATION PROCESSOR INITIALIZATION DURING WIRELESS CHARGING

CROSS REFERENCE TO RELATED APPLICATIONS

This application claims the benefit of U.S. Provisional Application No. 61/835,363, entitled "System and Method for Delayed Application Processor Initialization," filed Jun. 14, 2013, the disclosure of which is hereby incorporated herein by reference in its entirety.

FIELD

The present disclosure relates generally to wireless power. More specifically, the disclosure is directed to ensuring a transmitter in a wireless charging system has reached a sufficient power level to support the initialization of a charging device.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of operating a device. The method includes detecting power wirelessly received from a power transmitter. The method further includes wirelessly transmitting a message to the power transmitter in response to the received power. The method further includes determining that a power level of the received power has been adjusted in response to the message. The method further includes initializing, in response to the determining, a controller that is powered by the adjusted power level.

Another aspect of the disclosure provides an apparatus configured for performing the delay of an initialization sequence of a device. The apparatus includes a power management circuit operably connected to a wireless power receiver circuit. The power management circuit is configured to detect power wirelessly received from a power transmitter. The apparatus further includes a transceiver configured to wirelessly transmit a message to the power transmitter in response to the received power. The power management circuit is further configured to determine that a power level of the received power has been adjusted in response to the message. The power management circuit is further configured to initialize a controller in response to the determining, the controller configured to be powered at least in part by the adjusted power level.

Another aspect of the disclosure provides an apparatus for performing the delay of an initialization sequence of a device. The apparatus includes means for controlling the device. The apparatus further includes means for detecting power wirelessly received from a power transmitter. The apparatus further includes means for wirelessly transmitting a message to the power transmitter in response to the received power. The apparatus further includes means for determining that a power level of the received power has been adjusted in response to the message. The apparatus further includes means for initializing, in response to the determining, the controlling means, the controlling means configured to be powered by the adjusted power level.

Another aspect of the disclosure provides for a method of operating a wireless power receiver device, comprising initializing an application processor based on a first initialization sequence of signals in response to detecting power received via a wired power source and initializing the application processor based on a second initialization sequence of signals, different than the first initialization sequence of signals, in response to detecting power wirelessly received from a power transmitter, the second initialization sequence of signals based at least in part on a power level of the power wirelessly received from the transmitter.

Another aspect of the disclosure provides an apparatus configured for performing the delay of an initialization sequence of an application processor of a device wherein the apparatus comprises a first circuit configured to initialize the application processor based on a first initialization sequence in response to detecting power received via a wired power source and a second circuit configured to initialize the application processor based on a second initialization sequence, different than the first initialization sequence, in response to detecting power wirelessly received from a power transmitter.

Another aspect of the disclosure provides an apparatus for performing the delay of an initialization sequence of an application processor of a device, wherein the apparatus comprises means for initializing the application processor based on a first initialization sequence in response to detecting power received via a wired power source and means for initializing the application processor based on a second initialization sequence, different than the first initialization sequence, in response to detecting power wirelessly received from a power transmitter.

Another aspect of the disclosure provides a non-transitory computer readable medium storing code that when executed causes the delay of an initialization sequence of an application processor of a device, the computer readable medium including code for detecting power wirelessly received from a power transmitter. The computer readable medium further includes code for wirelessly transmitting a message to the power transmitter in response to the received power. The computer readable medium further includes code for determining that a power level of the received power has been adjusted in response to the message. The computer readable medium further includes code for initializing, in response to the determining, a controller that is powered by the adjusted power level.

Another aspect of the disclosure provides a non-transitory computer readable medium storing code that when executed causes the initialization of an application processor based on a first initialization sequence of signals in response to detecting power received via a wired power source, and initializing the application processor based on a second initialization sequence of signals, different than the first initialization sequence of signals, in response to detecting power wirelessly received from a power transmitter, the second initialization sequence of signals based at least in part on a power level of the power wirelessly received from the transmitter.

BRIEF DESCRIPTION OF THE DRAWINGS

FIG. 7 is a functional block diagram of the wireless communication between a power transmission unit ("PTU") and a power receiver unit ("PRU") and internal communication within a wireless device.

FIG. 8 is a functional block diagram of a power transmission unit ("PTU") and a power receiver unit ("PRU"), in accordance with an exemplary embodiment.

Figure 1:
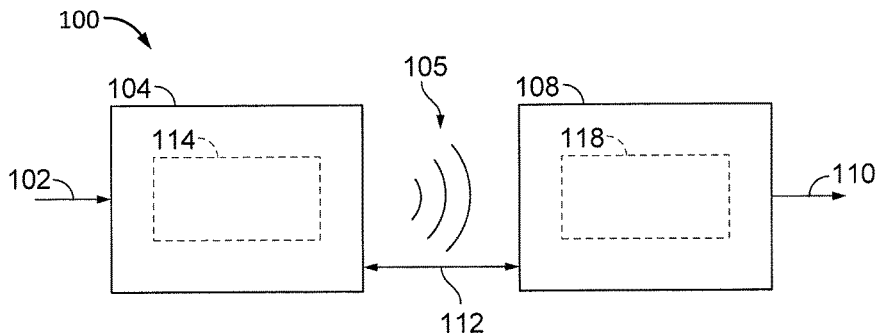
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils to be very close (e.g., millimeters apart). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by the receiver 108. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
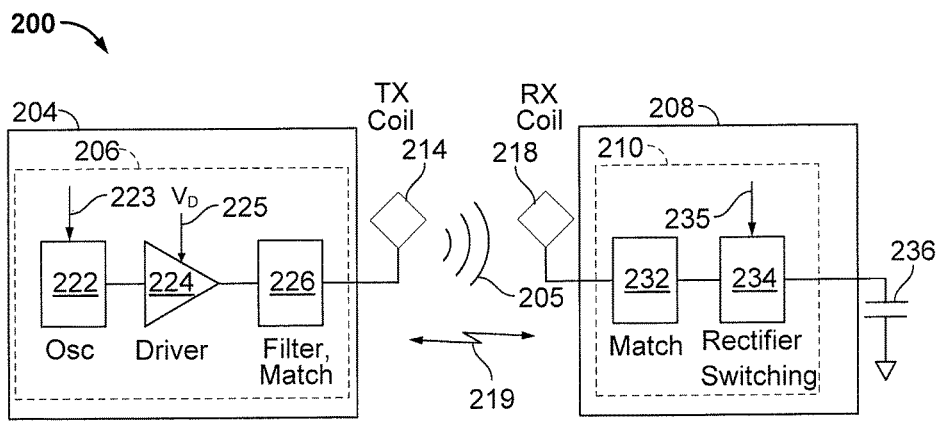
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc.). The receiver 208 and transmitter 204 may alternatively communicate via in-band signaling using characteristics of the wireless field 205.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
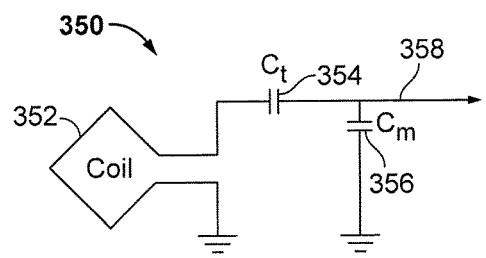
FIG. 3 is a schematic diagram of a portion of transmit circuitry or receive circuitry of FIG. 2, including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 354 and capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
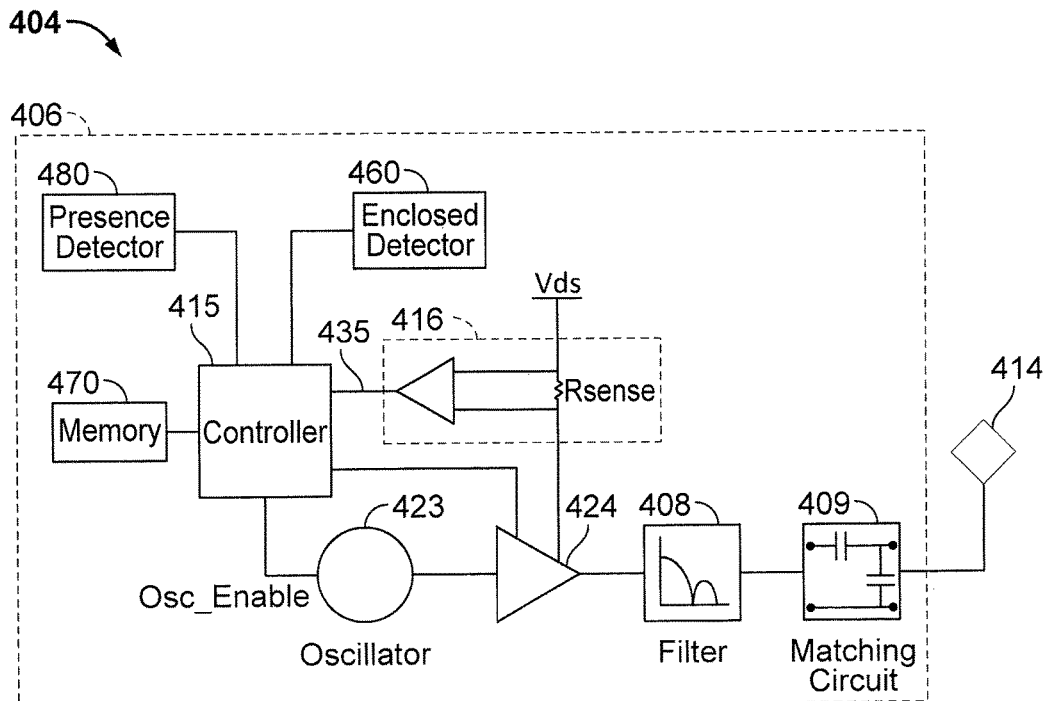
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
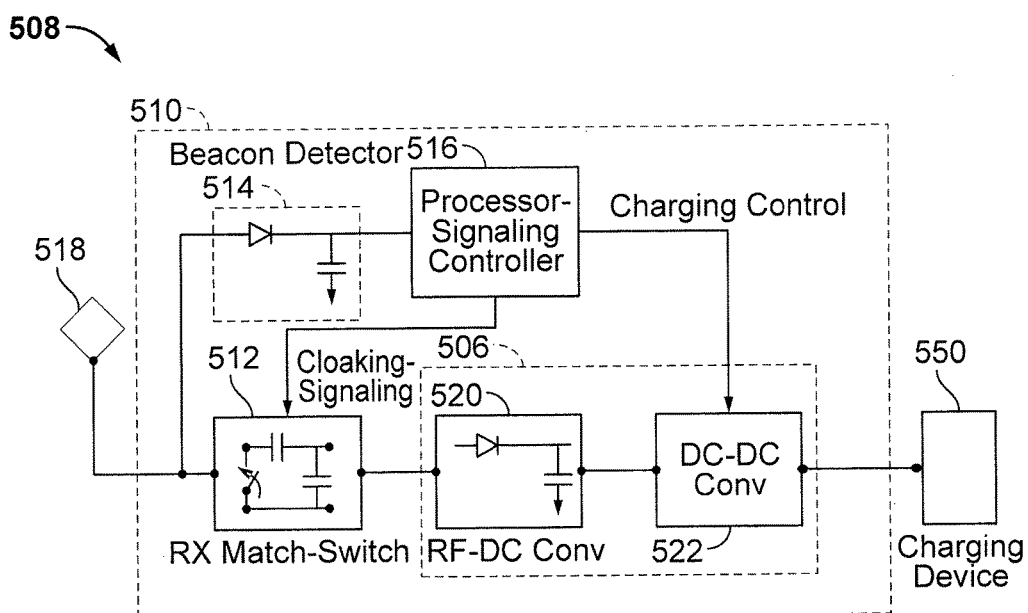
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$.

Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

When a wireless device 550 with a depleted battery, or one that is in power-off or power-save mode is introduced into the charging region of an exemplary power transmitter as described above, at least a portion of the internal system, chipsets, and application processor initializes (i.e., "boots") in order to complete the desired wireless charging. A similarly situated device 550 being introduced to wall or USB power follows a similar process. The principles and operations described herein may be applicable to initializing a variety of different type of circuitry including an application processor, modem chipsets, and the like.

The boot process of an exemplary embodiment requires a minimum amount of power to avoid failures. As a non-limiting example, initial power levels provided by a wireless power transmitter as described herein may not be sufficient for a complete and successful boot sequence until, for example, the receiver device has successfully been detected and/or "paired" with the transmitter. As such, it becomes important to prevent an incomplete or a failure of the boot sequence when a device is charging wirelessly. The following FIGS. 6-10 describe exemplary embodiments in which the boot sequence to an application processor, also referred to as "digital die" herein, resident within an exemplary device 550, is delayed in order to allow the power transmitter to achieve full power output.

Figure 6:
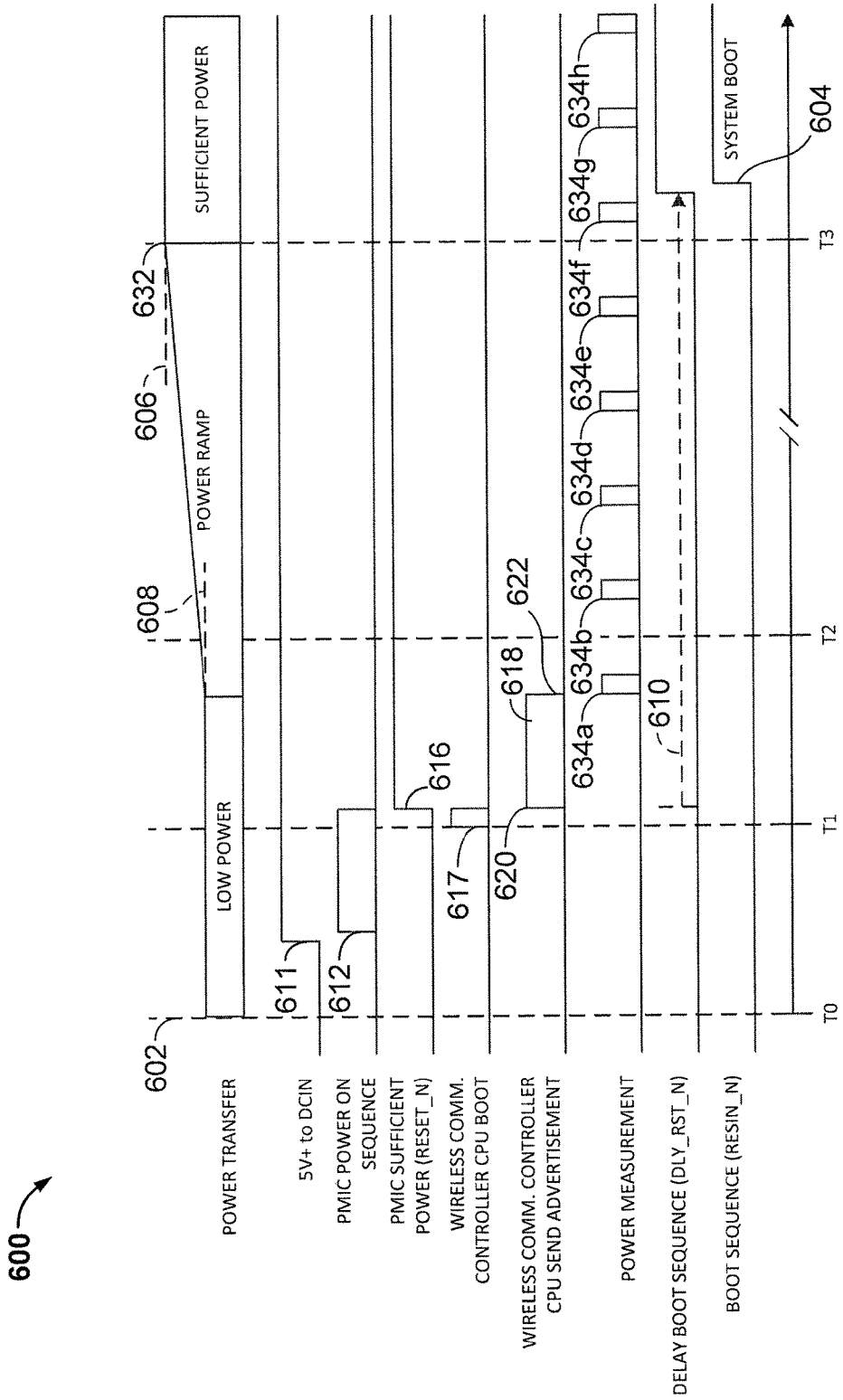
FIG. 6 is a timing diagram showing examples of various commands and the timing of such commands in accordance with an exemplary embodiment.

FIG. 6 illustrates an exemplary delayed initialization sequence 600, shown as a timeline (not to scale), depicting the timing of the interaction between an exemplary power transmitter 104, 204, 404, such as those described above in conjunction with FIGS. 1, 2, and 4 and an exemplary receiver, 108, 208, 508, such as those described in conjunction with FIGS. 1, 2, and 5. More specifically, timeline 600 shows an interaction between a given transmitter 404 and receiver 508 showing the initial interaction of the two components on the left beginning at time (e.g., zero) 602, the eventual initialization sequence of an exemplary device 550 at time 604, and an intervening delay 610 of the boot sequence. FIG. 6 is also applicable to the exemplary transmitter 702 and receiver 704 described in successive FIGS. 7-10 below. In an embodiment, a device 550 may wirelessly detect a power level 608 of a power transmitter, wirelessly communicate a request to the power transmitter to adjust the power level, periodically check the received power to determine that the power level has been adjusted to a sufficient level, and based on that determination, initialize a charging process or boot sequence of the device 550.

For purposes of FIG. 6, transmitter 404 and receiver 508 will be utilized for simplicity and conciseness; however it is to be appreciated by those skilled in the art that use of a single example herein should not be considered limiting, as the many exemplary embodiments described herein may use the same or similar systems interaction.

In an embodiment, a wireless power transmitter 404 transmits full power 606 when utilized as a power source for charging a wireless device 550 or other appropriate uses. However, in order to minimize power consumption when not charging, transmitter 404 may transmit at a lower power setting. While not in use, transmitter 404 can reduce its power output to low power 608. In one implementation, the power output may be approximately half of the full power output of the transmitter 404. In an embodiment, this is known as a "low power state." It should be appreciated by those skilled in the art that the exemplary use of "half power" should not be considered limiting as nearly any reasonable power level less than full power 606 can be used to reduce transmitter 404 power consumption.

As a non-limiting example, one (1) Watt of power (e.g., 200 mA at 5 Volts) may be provided during a low power state. In an embodiment, once communication between the transmitter 404 and the receiver 508 is established (or any other procedures for validating the receiver 508 are completed), the power output increases to a power level 606 sufficient to charge or power a device. As a non-limiting example, the sufficient power may be between, for example, 2.5 W and 5 W (e.g., 500 mA-1 A at 5 Volts) or higher. In the low power state, power may be transmitted as a series of pulses referred to as a "low power beacon" in order to save power. It should be understood by those skilled in the art that a full power state 606 is sufficient power to successfully initialize and charge a given electronic system, such as wireless device 550, while the power level in the low power state is generally insufficient for various operations, for example, a complete system boot.

In an embodiment, the receiver 508 is placed within a charging region of the transmitter 404 in order to begin the charging process at time 602 (time zero—T0). The receiver 508 may be associated with an exemplary device 550 in an unpowered state, or one having a depleted battery, for instance. Load sensing circuitry, such as load sensing circuit 416 within transmitter 404 discussed above, detects fluctuations in the bias current provided to transmitter driver circuit 424, enabling the transmitter 404 to detect the presence of a receiver 508 in a charging region. Presence detector 480 or enclosed detector 460 may also be employed to provide input to the controller 415 in order to adjust power output.

In an embodiment, receiver circuitry 514 also detects the transmission of the low power beacon at time 611 and rectifies the reduced RF signal energy of the beacon (not shown) into a nominal power for awakening un-powered or power-depleted circuits as discussed above. The power thus derived by receiver 508 is used by receive circuitry 510 to initiate the power-on sequence of an exemplary power management circuit of device 550 at time 612. As a non-limiting example, such a sequence may begin with the initialization of a power management integrated circuit ("PMIC") or circuits, enabling the initialization of system processes and charging of the device's 550 battery. As a non-limiting example, a given power management circuit may include an interface PMIC 722 and a core PMIC 724, both described below in conjunction with FIGS. 7-10. In an embodiment, once sufficient power is drawn either from the battery or from the low power beacon, both the interface PMIC 722 and core PMIC 724 may initialize.

Following the initialization sequence of the power management circuitry, the device 550 having sufficient onboard battery power or being connected to an external power source, may command the initialization of the device's 550 power management circuitry at time 616, in addition to an application processor. However, according to an embodiment, the initialization of the application processor in a device 550, from an un-powered or power-depleted state through the use of wireless power, is delayed 610 until the transmitter 404 reaches sufficient power output or full power 606 to prevent device 550 errors, faults, or system crash during initialization resulting from insufficient power available. In an embodiment, delay 610 may be described as the delay between the time 616 when the PMIC has sufficient power to command initialization of an exemplary device 550 and time 604 when the device is receiving a sufficient amount of power for initialization of a boot sequence. A non-limiting example of a manner of delaying such initialization may be to temporarily limit the number of subsystems booted in effort to maintain a receiver 508 power requirement below that of the low power beacon (described by power level 608), while also preventing the complete boot sequence of device 550. Full initialization may be delayed at least until sufficient power is available in the device 550 battery. Such an exemplary architecture may include the initialization of the interface PMIC 722 (described below) enabling charging and may also illuminate one or more LEDs (light emitting diode) to signal the charging of device 550. Such a sequence commonly requires a subsequent manual input, such as actuation of a "power on" button, to initialize the device 550 after sufficient power is available to the system.

In an embodiment, a wireless communication controller 710 (described below in conjunction with FIGS. 7 and 8), such as Bluetooth™ ("BT") is initialized within device 550 to communicate with a corresponding system within the transmitter 404 during the low power beacon beginning at time 617. Once the PMIC initialization is started at time 612, a wireless communication controller 710 (e.g., a BT central processing unit ("CPU")) may be initialized. In some embodiments, the wireless communication controller 710 may be a port of, or configured as a controller (e.g., 415 of FIG. 4) also used to control functions and operations of the wireless power transmitter and receiver circuitry 406 and 410. In an embodiment, a wireless communication controller 710 may send a message, or advertisement 618 at time 620 alerting the transmitter 404 of power requirements higher than the current low power beacon. Advertisement 618 may further coincide with the completion of the PMIC power on sequence at time 616. This notification to the transmitter 404 may command it out of the power-save mode. Communication may be established between transmitter 404 and receiver 508 at time 622, wherein the transmitter is commanded to ramp power output to full power 606 in order to begin charging. This power ramp process is shown as beginning at time 622 and depicts an exemplary time delay 610 for the transmitter 404 to achieve full power output at time 632.

Due to the potentially insufficient power requirements for complete initialization of the device 550 during delay 610, the receiver 508 may condition the initialization of the device 550 application processor on the power output of the transmitter 404. Following the advertisement 618 and the beginning of the power ramp, beacon circuitry 514 may be commanded to periodically poll the power output of transmitter 404 during times 634a-634h.

In an embodiment, the receiver 508 may continue polling the power output of transmitter 404 throughout the course of the charging or it may cease polling after a predetermined amount of time. In an embodiment transmitter 404 reaches full power 606 at time 632. Once the receiver circuitry 510 determines the transmission or receipt of sufficient power during time 634f, for example, the application processor of the charging device 550 is commanded to initialize. In an embodiment, this process may occur autonomously without any manual interaction with the device 550. Further, receipt of sufficient power from the transmitter 404 may allow the display a "splash screen" on the device 550 display as it charges, showing the status of the battery or other applicable indications.

FIG. 7 is a functional block diagram of the interaction between a transmitter 702 and a receiver 550 in a wireless power charging system 700, making use of the delayed initialization sequence 600 described above. Power transmitting unit ("transmitter" or "PTU") 702 is depicted in wireless communication with a power receiving unit ("receiver" or "PRU") 704. Receiver 704 has an exemplary wireless communication controller 710, a power management circuit 720 and a wireless device controller 730 that each interact within a device 550 as described herein. In an embodiment, wireless communication controller 710 may be implemented as a BT controller or other appropriate communication system known in the art and be configured to wirelessly transmit data to another device such as a PTU 702. In an embodiment, the power management circuit 720 may further be an exemplary PMIC or multiple PMICs as described below, a similar circuit, or combination of circuits known in the art for managing power to specific subsystems of a given device 550. In an embodiment, the wireless device controller 730 may include a circuit or circuits configured to control or perform internal functions of a wireless device 550, such as initialization and control of an application processor. It should be appreciated by those skilled in the art that the exemplary functions described should not be considered limiting.

As such, in accordance with certain aspects of embodiments described herein, when an exemplary device 550 having a receiver 704 is placed within a charging region 708 of the transmitter 702 in power save mode, the receiver 704 may rectify the low power beacon to boot the power management circuit 720 and wireless communication controller 710, as is shown, for example, at time 617 of FIG. 6. This allows communication with the analogous system onboard the transmitter 702. Once wireless communication is established, the transmitter 702 ramps its power output to full power 606. During the delay 610 between low power 608 and full power 606, the wireless communication controller 710 polls the transmitter 702 power output. Only when sufficient power is available and such a power level is sensed by the power management circuit 720 does it command the wireless device controller 730 to initiate the device's 550 boot sequence. Such a delay ensures sufficient power is transmitted to the device 550, preventing boot errors and data corruption while providing availability of required functions. In an embodiment, this sequence may also eliminate any manual input requirement for initialization of the boot sequence, allowing such a sequence to occur autonomously.

FIG. 8 depicts another functional block diagram of a wireless power transfer system described in conjunction with FIG. 7. In an embodiment, the exemplary wireless communication controller 710 may be a wireless connectivity chip for controlling BT, IEEE 802.11, or other protocols known in the art. In an embodiment, the power management circuit 720 may further incorporate an interface PMIC 722 and an exemplary core PMIC 724. In such architecture, the interface PMIC 722 and core PMIC 724 perform functions for the proper operation of the system. As a non-limiting example, the interface PMIC 722 may be used for charging operations, among other things, while the core PMIC 724 may control the system reference clock and other internal functions. In an embodiment, while the initialization command, or boot signal 750, is enabled by the core PMIC 724, input from both interface PMIC 722 and core PMIC 724 may send an appropriate boot signal 750 to an exemplary wireless device application processor (digital die) 740, as will be shown below in FIG. 9. In such an embodiment, neither the interface PMIC 722, nor the core PMIC 724 are capable of both 1) detecting when transmitter 702 has reached full power; and 2) sending the appropriate boot signal 750 to the digital die 740. It is to be appreciated by those skilled in the art that the foregoing characteristics of the interface PMIC 722 and core PMIC 724 should not be considered limiting, as the functions described herein are exemplary steps to accomplish a desired outcome.

In an embodiment, transmission of the boot signal 750 to digital die 740 is predicated on both a signal 752 from the wireless communication controller 710 to interface PMIC 722, and signal 754 from interface PMIC 722 to core PMIC 724 indicating power from the transmitter 702 is sufficient to support a successful initialization. In an embodiment, signal 752 may include an indication from the wireless communication controller 710 that the power being received is generated from a wireless power transmitter or that the power input is from another wired means such as a USB or wall connection, for instance. Further, signal 752 may include an indication that the transmitter 702 is transmitting full power. In an embodiment, signal 754 may include an indication of proper power up of the interface PMIC 722 and subsequent charging of the device 550 battery. Once the power management circuit 720 has determined that both the interface PMIC is receiving the proper amount of power from the transmitter 702 and the core PMIC 724 has properly initialized and is receiving power, the boot signal 750 is sent to the digital die 740, and the system on chip ("SoC") is allowed to boot.

Figures 9, 10:
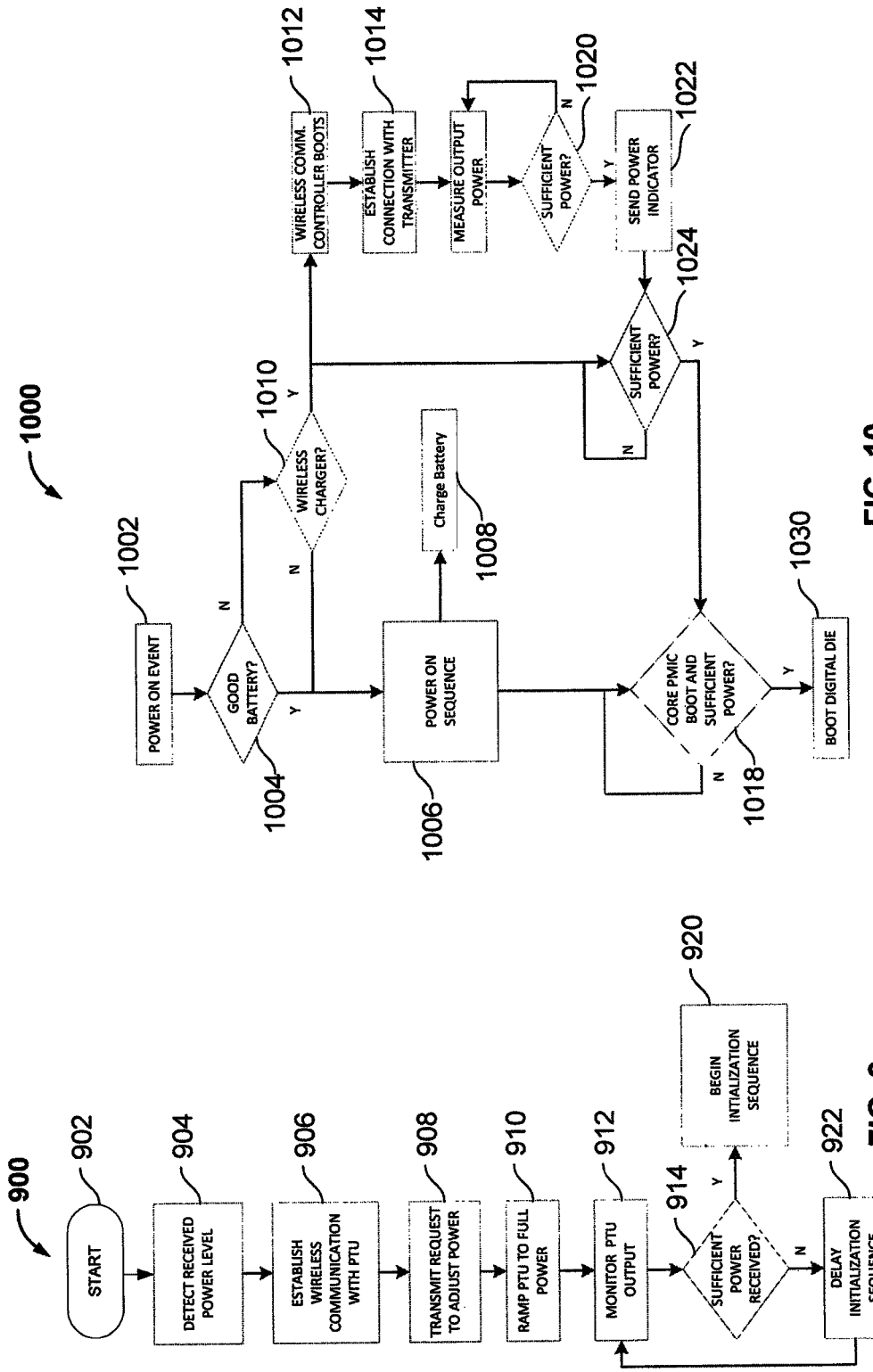
FIG. 9 is a flowchart of an exemplary method for delaying the initialization sequence of a wireless device during wireless charging, in accordance with an exemplary embodiment.
FIG. 10 is a flowchart of another exemplary method for delaying the initialization sequence of a wireless device during wireless charging, in accordance with an exemplary embodiment.

FIG. 9 is a flowchart of an exemplary process 900 for delaying the initialization sequence of a wireless device 550 implementing the timeline of FIG. 6. Process 900 begins with block 902 in which a given wireless device 550 may be placed within range of a wireless power transmitting unit ("transmitter" or "PTU") 702, as described herein. The device 550 detects the low power beacon from the transmitter 702 while the transmitter 702 detects the presence of a device 550 at block 904. At block 906, wireless communication between the transmitter 702 and the receiver 704 is established. In block 908 a request is sent from receiver 704 to transmitter 702 to exit power saving mode 608 and begin transmitting at full power 606. The transmitter 702, in response to the request, and sensing the presence of a wireless device 550, ramps the power output from the low power beacon 608 to full power 606 in block 910. In some embodiments, block 906 is optional and the transmitter 702 ramps up power in response to establishing communication with the receiver 704. The time associated with the increase in power ("power ramp") can be correlated to the delay 610 described in FIG. 6 above. The power management controller 720 monitors the power output of transmitter 702 at block 912 and at decision block 914, determines whether and when the receiver 704 is receiving sufficient power. If the power is insufficient, the power management circuit 720 (or interface PMIC 752) continues to hold the digital die 740 in reset, delaying the initialization command, and returning process 800 to block 912 to monitor the transmitter 702 output. At decision block 914, the system determines that transmitter 702 power output is sufficient to sustain a successful initialization, boot signal 750 or other appropriate commands may be sent from the power management circuit 720 to the digital die 740 to initiate the appropriate boot sequence.

Referring to FIG. 10, another flowchart of an embodiment of a method for delaying the initialization sequence of a wireless device during wireless charging, is shown. The flowchart addresses a device 550 with minimal battery charge, a depleted charge, or in an un-powered state.

The process 1000 begins with block 1002 when a device 550 is placed within a charging region of a transmitter 702 or external power is applied from USB or wall power, for example, initiating a "power on" event. If the device 550 battery charge is sufficient, or the device 550 is connected to external power at decision block 1004, the process 1000 proceeds to block 1006 where an exemplary system "power on sequence" is initiated. As a non-limiting example, the system may boot the interface PMIC 722 using external power or battery power to begin the charging process at block 1008. The battery check at decision block 1004 may be executed continuously or periodically throughout the process 1000.

Should the battery contain insufficient charge, process 1000 then may determine if the wireless charging is used at decision block 1010. If wireless charging is in use, the wireless communication controller 710 may boot at block 1012 using power derived from the low power beacon in order to wirelessly communicate with transmitter 702. The process 1000 may proceed to block 1014, communicating the request to the transmitter 702 to increase to full power 606 (FIG. 6).

During the power on sequence in block 1006, the interface PMIC 722 may send indications to the rest of the power management circuit of a successful initialization and initialize core PMIC 724 as described in conjunction with FIG. 8. At block 1006 core PMIC 724 may send a boot signal 750 to digital die 740, subject to a determination at decision block 1018. At decision block 1018, at least two determinations are made. First, the power management circuitry (interface PMIC 722 and core PMIC 724) may be configured to ensure a successful power management initialization sequence is complete. Once interface PMIC 722 and core PMIC 724 are initialized, a boot signal 750 to the digital die 740 is enabled, but deferred pending the receipt of sufficient power from the transmitter 702. The second determination is the measurement of power received from transmitter 702. The boot signal 750 is deferred until sufficient power, as measured by the power management circuitry, is sufficient to sustain a successful boot sequence. In an embodiment, sufficient power may be "full power" output of the transmitter 702, however it is to be appreciated by those skilled in the art that the power received may be less than is actually transmitted, however "sufficient" to enable a proper and complete boot sequence. Such a safeguard may minimize the chance of corrupted data, an unsuccessful boot due, or other failures associated with inadequate power received from the transmitter 702.

If both criteria are not satisfied at decision block 1018, boot signal 750 is not transmitted, and power to the main system controller and application processor is held in reset. Thus, boot signal 750 is deferred until the power management circuitry determines sufficient power is being received.

In the event the device 550 does not have a sufficient charge to boot at block 1004, the power management circuitry at decision block 1010 determines whether the power applied to the device 550 is wireless power from a transmitter 702 or if it is from a wired connection. If wireless power is applied, the interface PMIC 722 commands wireless communication controller 710 initialization at block 1012 (shown here as an exemplary BT controller). Once the wireless communication controller 710, is initialized, the advertisement 618 (FIG. 6) is transmitted in order to establish wireless communication with the transmitter 702. Once wireless communications are established, the wireless communication controller 710 transmits a request from the interface PMIC 722 to the transmitter 702 to increase to full power 606 at block 1014, monitoring the transmitter 702 power output at decision block 1020. Once sufficient power is received at block 1022, wireless controller 720 transmits a signal to the interface PMIC 722 indicating that sufficient power is being received from the transmitter 702. At decision block 1024 an exemplary interface PMIC 722 may send input to the system indicating sufficient power is being received from the transmitter 702. Thus, at decision block 1018, when both sufficient power is being received from transmitter 702, and a boot signal 750 is enabled by the core PMIC 724, the boot signal 750 is sent to the digital die 740 at block 1030, initializing device 550.

Figure 11:
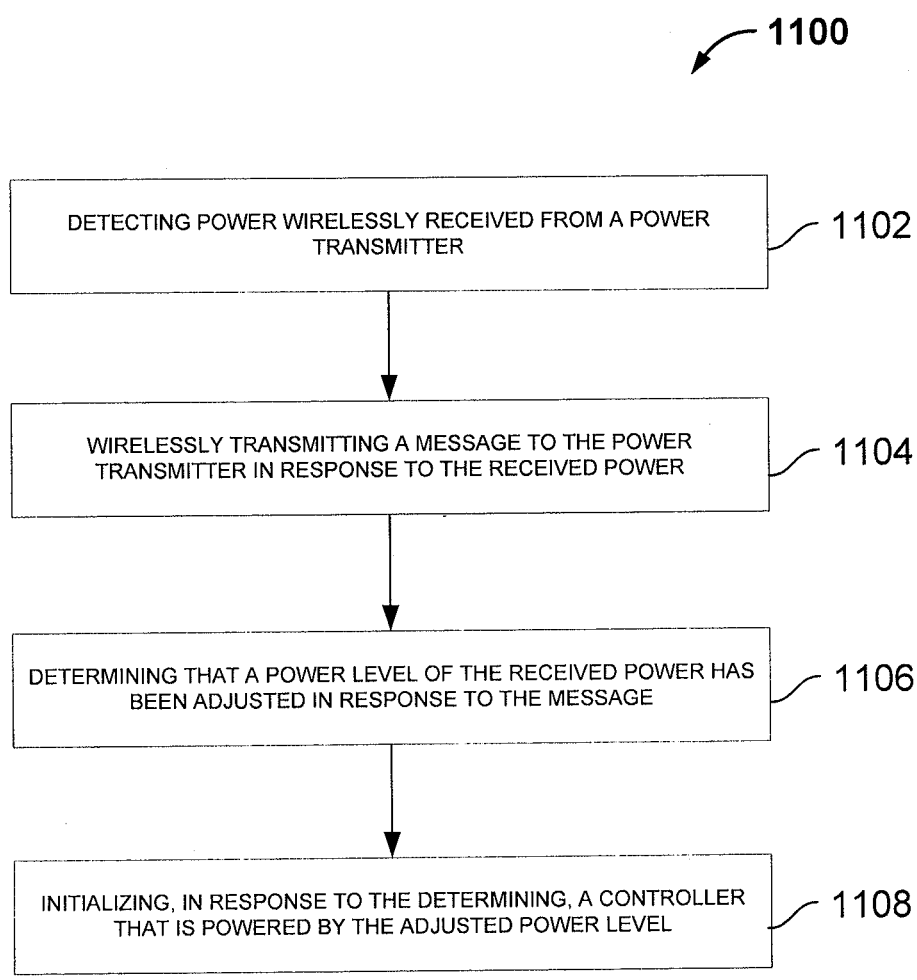
FIG. 11 is a flowchart of another exemplary method for delaying the initialization sequence of a wireless device during wireless charging, in accordance with an exemplary embodiment.

Referring to FIG. 11, another flowchart of an embodiment of a method for delaying the initialization sequence of a wireless device during wireless charging is shown and generally designated 1100. Method 1100 begins at block 1102 as the receiver 704 of device 550 begins detecting power wirelessly received from a power transmitter 702, as discussed above. Once the receiver 704 detects power, such as the low power beacon at time 611, communication may be established with the transmitter 702 as described herein. At block 1104, the wireless communication controller 710 may command the receiver 704 to wirelessly transmit a message to the power transmitter in response to the received power from transmitter 702, detected in block 1102. The message may command the transmitter 702 to increase power output. Once the circuitry (as discussed with respect to FIGS. 7 and 8 above) within receiver 704 determines that a power level of the received power has been adjusted in response to the message at block 1106, a command may be received by the wireless device controller 730 at block 1108, initializing, in response to the determining, a controller that is powered by the adjusted power level.

Figure 12:
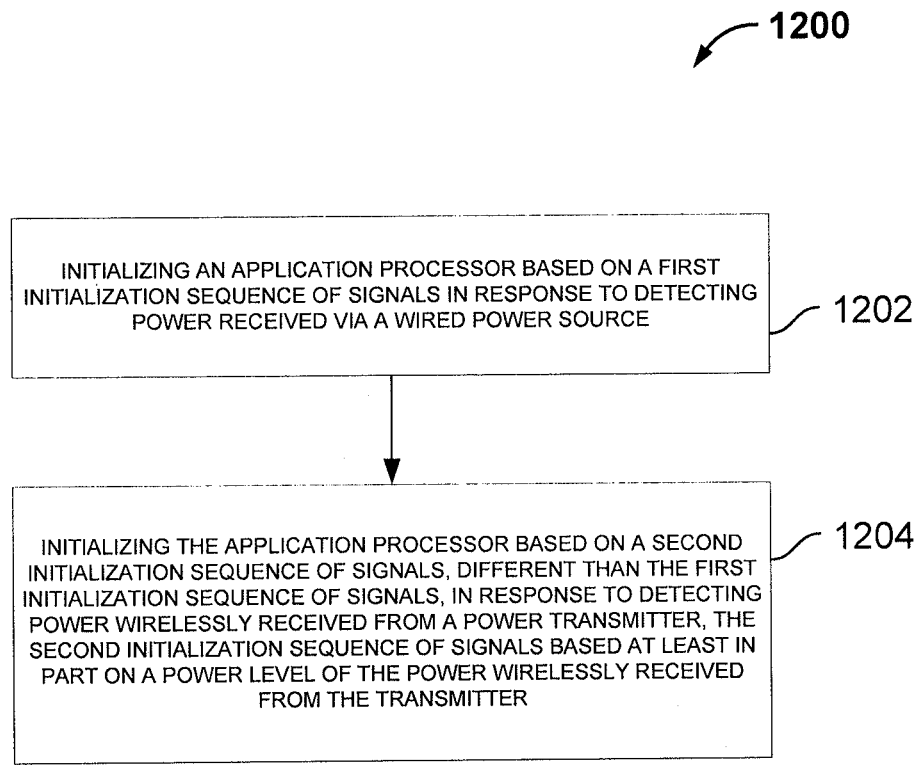
FIG. 12 is flowchart of another exemplary method for delaying the initialization sequence of a wireless device during wireless charging, in accordance with an exemplary embodiment.

Referring to FIG. 12, another flowchart of an embodiment of a method for delaying the initialization sequence of a wireless device during wireless charging is shown and generally designated 1200. Block 1202 describes initializing an application processor based on a first initialization sequence of signals in response to detecting power received via a wired power source. The first initialization of signals may correspond to the processes discussed above with respect to initialization of internal circuits in response to the application of power. The processes of block 1202 may further parallel certain aspects of process 1000, similar to a negative determination at decision block 1010, wherein the first initialization sequence may correspond to the device 550 being connected to a wired power source.

Once sufficient power is received by receiver 704, a command may be sent from the power management circuit 720 at block 1204, initializing the application processor based on a second initialization sequence of signals, different than the first initialization sequence of signals, in response to detecting power wirelessly received from a power transmitter 702, the second initialization sequence of signals based at least in part on a power level of the power wirelessly received from the transmitter 702. The second initialization sequence of signals may be different from the first initialization of signals taking into account the methods disclosed herein. Specifically, the second initialization of signals may include the initialization of wireless communication controller 720 and various power management circuits in response to the adjusted power level of transmitter 702. Block 1204 may further be similar to process 1000 between decision block 101 and decision blocks 1020 and 1024.

Figure 13:
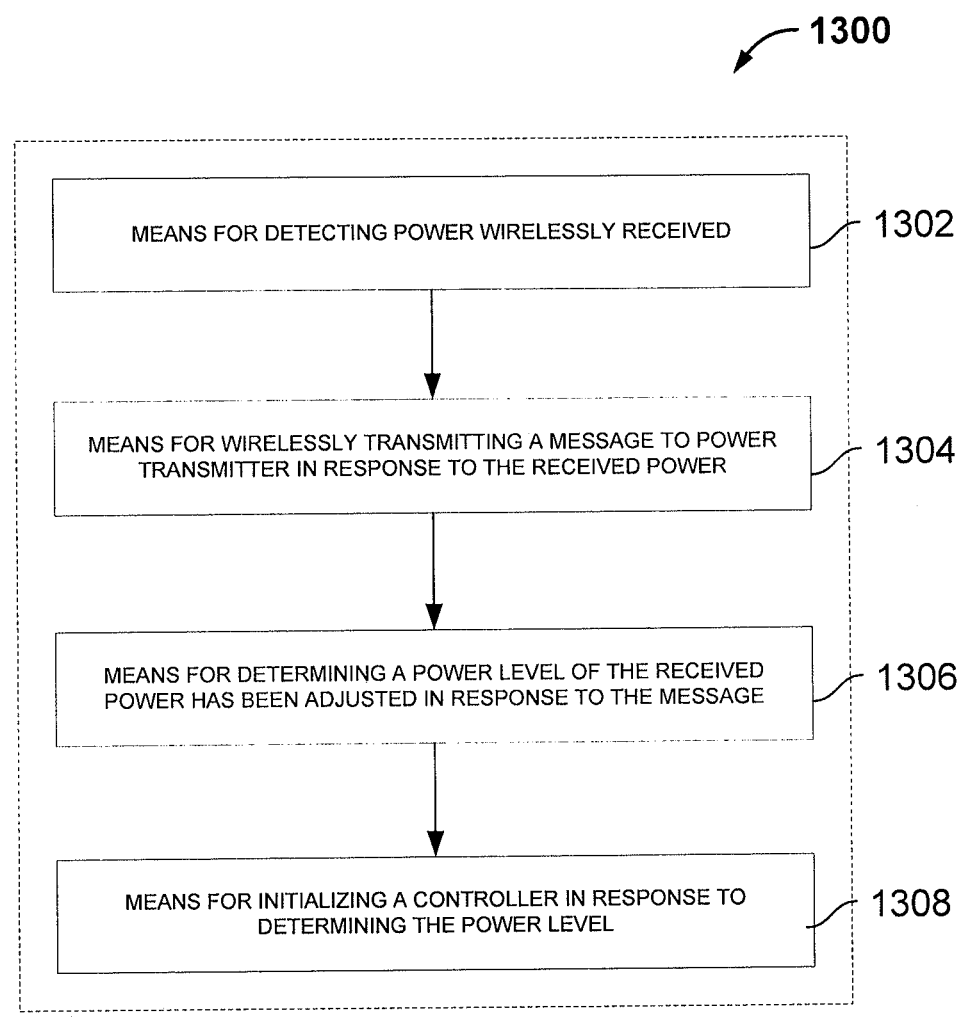
FIG. 13 is a functional block diagram of an embodiment of a power receiver unit, in accordance with an exemplary embodiment.

Referring to FIG. 13, a functional block diagram of an exemplary power receiver unit is shown and generally designated 1300. Receiver 1300 includes means for detecting 1302 power wirelessly received from a power transmitter 702 or similar, means for transmitting a message or request to the transmitter 702 to adjust wireless power output, means for determining that the power level has been adjusted to a sufficient level as received at receiver 1300, and means for initializing the boot sequence of a device 550 associated with receiver 1300.

Means 1302 detects power wirelessly received from a power transmitter. In an embodiment, the power detected by means 1302 may be an exemplary low power beacon as described herein. The receiver may rectify the low power beacon to derive sufficient power to initialize means for transmitting 1304, similar to that described in conjunction with FIG. 5. Means 1304 may include wireless systems as disclosed herein enabling the receiver 1300 allowing communication with a wireless power transmitter, such as transmitter 702, as described above. Means for transmitting 1304 may communicate a message or request to the transmitter 702, to adjust wireless power output. In response to such a communication, the power transmitter 702 may increase to full power output 606 (in FIG. 6), while means for determining 1306 within receiver 1300, determines whether and when the wireless power received from transmitter 702 has been adjusted to a sufficient level allowing a complete boot sequence for an associated device 550.

Figure 14:
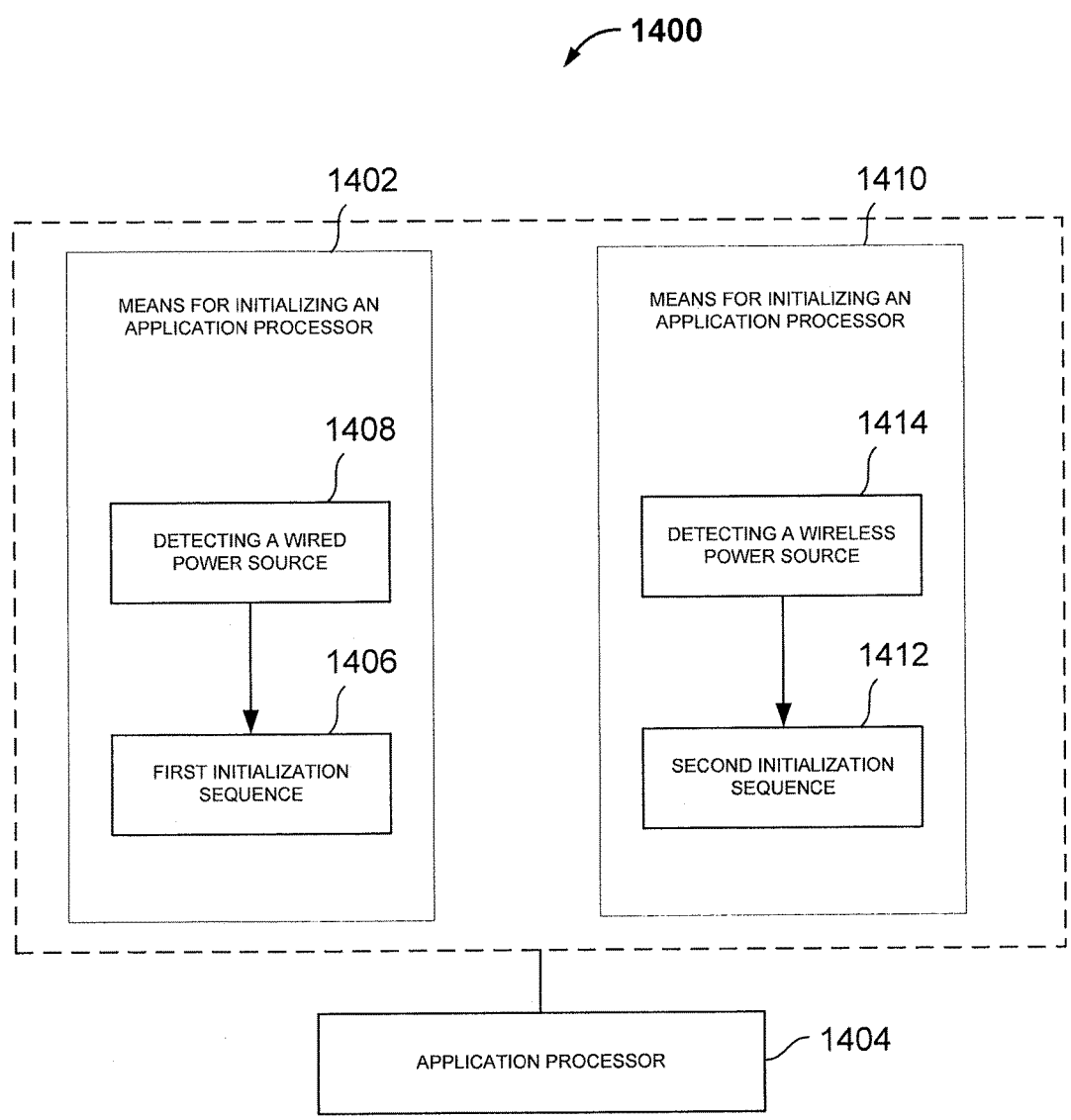
FIG. 14 is a functional block diagram of an embodiment of a power receiver unit, in accordance with an exemplary embodiment.

Referring to FIG. 14, a functional block diagram of an exemplary receiver unit is shown and generally designated 1400. Within receiver unit 1400 are means 1402 and means 1410, performing a delayed initialization of an application processor 1404, analogous to previous embodiments. The first means 1402 is a means for initializing an application processor 1404 based on a first initialization sequence 1406 that is commenced in response to the detecting of a wired power source 1408. Such a means 1402 may have similar attributes as application processor 740 of FIG. 7. In certain embodiments, the functions of means 1402 follow a similar process as depicted in FIG. 10, such as decision block 1010 and the detection of a wireless charger or a wired power connection.

In addition to means 1402, receiver unit 1400 also provides a second means 1410 for initializing an application processor 1404 based on a second initialization sequence 1412 performed in response to detecting power wirelessly received 1414 from a power transmitter. In certain embodiments, means 1410 may follow an analogous process as FIG. 10 at decision block 1010. Once the power has been detected by the receiver unit 1400 either from a wired power source 1408 or wireless power source 1414, means 1402 or means 1410, respectively, may conduct a delayed initialization of the application processor 1404, in a manner similar to previous embodiments.

Utilizing the system and methods described herein may allow a device in a power off state or a device with depleted batteries to begin the wireless charging process and delay the initialization of an application processor until sufficient power is received from a power transmitter. These methods may thus prevent an incomplete boot, data corruption, system crash, or other failures and casualties related to insufficient power available during initialization.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate, or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a device, comprising:
    detecting power wirelessly received at a first power level from a power transmitter via a receiver circuit coupled to a magnetic field generated by the power transmitter;
    wirelessly transmitting, in response to determining that the first power level is below a threshold value, a message to the power transmitter, the message comprising a request for the power transmitter to increase a level of power transmitted;
    periodically detecting a level of power wirelessly received at the receiver circuit from the power transmitter once the message is transmitted;
    delaying a boot sequence of a controller of the device if the level of power wirelessly received at the receiver circuit from the power transmitter is less than the threshold value;
    determining that the level of power wirelessly received at the receiver circuit from the power transmitter has increased above the first power level to or above the threshold value; and
    initializing the boot sequence of the controller in response to the determining that the level of power wirelessly received has increased above the first power level to or above the threshold value, wherein the controller is powered by the power wirelessly received at the receiver circuit from the power transmitter.

2. The method of claim 1 wherein the threshold value is indicative of a power level that is sufficient to power the controller.

3. The method of claim 1 further comprising, in response to detecting power wirelessly received from the power transmitter, initializing a power management circuit, wherein initializing the boot sequence of the controller occurs in response to the power management circuit initialization.

4. The method of claim 3 wherein the threshold value is higher than the first power level.

5. The method of claim 1 wherein transmitting the message comprises transmitting the message via a personal area network.

6. The method of claim 1 further comprising:
    detecting a sufficient battery charge level; and
    initializing, in response to the detecting of the sufficient battery charge level, a power on sequence of at least a power management circuit.

7. The method of claim 1 further comprising:
    detecting a wired power source; and
    initializing a wireless communication controller in response to the detecting the wired power source.

8. The method of claim 1, wherein the controller is configured as an application processor.

9. An apparatus configured for performing the delay of an initialization sequence of a device, that apparatus comprising:
    a power management circuit operably connected to a wireless power receiver circuit and configured to detect power wirelessly received at a first power level from a power transmitter via the wireless power receiver circuit coupled to a magnetic field generated by the power transmitter; and a transceiver configured to, in response to determining that the first power level is below a threshold value, wirelessly transmit a message to the power transmitter, the message comprising a request for the power transmitter to increase a level of power transmitted, the power management circuit further configured to:

periodically determine a level of power wirelessly received at the wireless power receiver circuit from the power transmitter once the message is transmitted;

delay a boot sequence of a controller of the device if the level of power wirelessly received at the receiver circuit from the power transmitter is less than the threshold value;

determine that the level of power wirelessly received at the receiver circuit from the power transmitter has increased above the first power level to or above the threshold value;

initialize the boot sequence of the controller in response to the determining that the level of power wirelessly received at the receiver circuit from the power transmitter has increased above the first power level to or above the threshold value, the controller configured to be powered by the power wirelessly received at the receiver circuit from the power transmitter.

10. The apparatus of claim 9 wherein the threshold value is indicative of a power level that is sufficient to power the controller.

11. The apparatus of claim 9 further configured to, in response to detecting power wirelessly received from the power transmitter, initialize the power management circuit, wherein the initialization of the boot sequence of the controller occurs in response to the power management circuit initialization.

12. The apparatus of claim 11 wherein the threshold value is higher than the first power level.

13. The apparatus of claim 9, the transceiver further configured to transmit the message via a personal area network.

14. The apparatus of claim 9, wherein the power management circuit is further configured to:
detect a sufficient battery charge level; and
initialize, in response to the sufficient battery charge level, a power on sequence of at least the power management circuit.

15. The apparatus of claim 9, wherein the power management circuit is further configured to:
detect a wired power source; and
initialize, in response to the detection, a wireless communication controller.

16. The apparatus of claim 9, wherein the controller is configured as an application processor.

17. An apparatus for performing the delay of an initialization sequence of a device, the apparatus comprising:
means for controlling the device;
means for detecting power wirelessly received at a first power level from a power transmitter via a means for receiving wireless power coupled to a magnetic field generated by the power transmitter;
means for wirelessly transmitting, in response to determining that the received power level is below a threshold value, a message to the power transmitter, the message comprising a request for the power transmitter to increase a level of power transmitted;
means for periodically detecting a level of power wirelessly received at the receiving means from the power transmitter once the message is transmitted;
means for delaying a boot sequence of the controlling means of the device if the level of power wirelessly received at the receiving means from the power transmitter is less than the threshold value;
means for determining that the level of power wirelessly received at the receiving means from the power transmitter has increased above the first power level to or above the threshold value; and
means for initializing the boot sequence of the controlling means in response to determining that the level of power wirelessly received at the receiving means from the power transmitter has increased above the first power level to or above the threshold value, wherein the controlling means is powered by the power wirelessly received at the receiving means from the power transmitter.

18. The apparatus of claim 17 wherein the threshold value is indicative of a power level that is sufficient to power the controlling means.

19. The apparatus of claim 17 further comprising means for initializing a power management circuit in response to detecting power wirelessly received from the power transmitter, wherein the initialization of the boot sequence of the controlling means occurs in response to the power management circuit initialization.

20. The apparatus of claim 19 wherein the threshold value is higher than the first power level.

21. The apparatus of claim 17 further comprising means for transmitting the message via a personal area network.

22. The apparatus of claim 17 further comprising:
means for detecting a sufficient battery charge level; and
means for initializing, in response to the sufficient battery charge level, a power on sequence of at least a power management circuit.

23. The apparatus of claim 17 further comprising:
means for detecting a wired power source; and
means for initializing, in response to the detecting the wired power source, a wireless communication controller.

24. A method of operating a wireless power receiver device, comprising:
initializing an application processor based on a first initialization sequence of signals in response to detecting power received via a wired power source; and
initializing the application processor based on a second initialization sequence of signals, different than the first initialization sequence of signals, in response to detecting power wirelessly received from a power transmitter,
wherein a level of power received from the power transmitter is periodically detected at the wireless power receiver device, and the initializing based on the second initialization sequence of signals is delayed based at least in part on the periodic detecting if the level of power wirelessly received at the receiver circuit from the power transmitter is less than a threshold value, such that the application processor is not initialized based on the second initialization sequence of signals until the level of power of the power wirelessly received from the power transmitter increases to or above the threshold value.

25. The method of claim 24 wherein the threshold value is indicative of a level of power that is sufficient to power the application processor.

26. The method of claim 24, wherein the second initialization sequence of signals is further based on establishing a communication link between the wireless power receiver device and the power transmitter.

\* \* \* \* \*